No. 769,632. PATENTED SEPT. 6, 1904.
A. G. PUERNER.
LUBRICATOR.
APPLICATION FILED APR. 28, 1904.
NO MODEL.
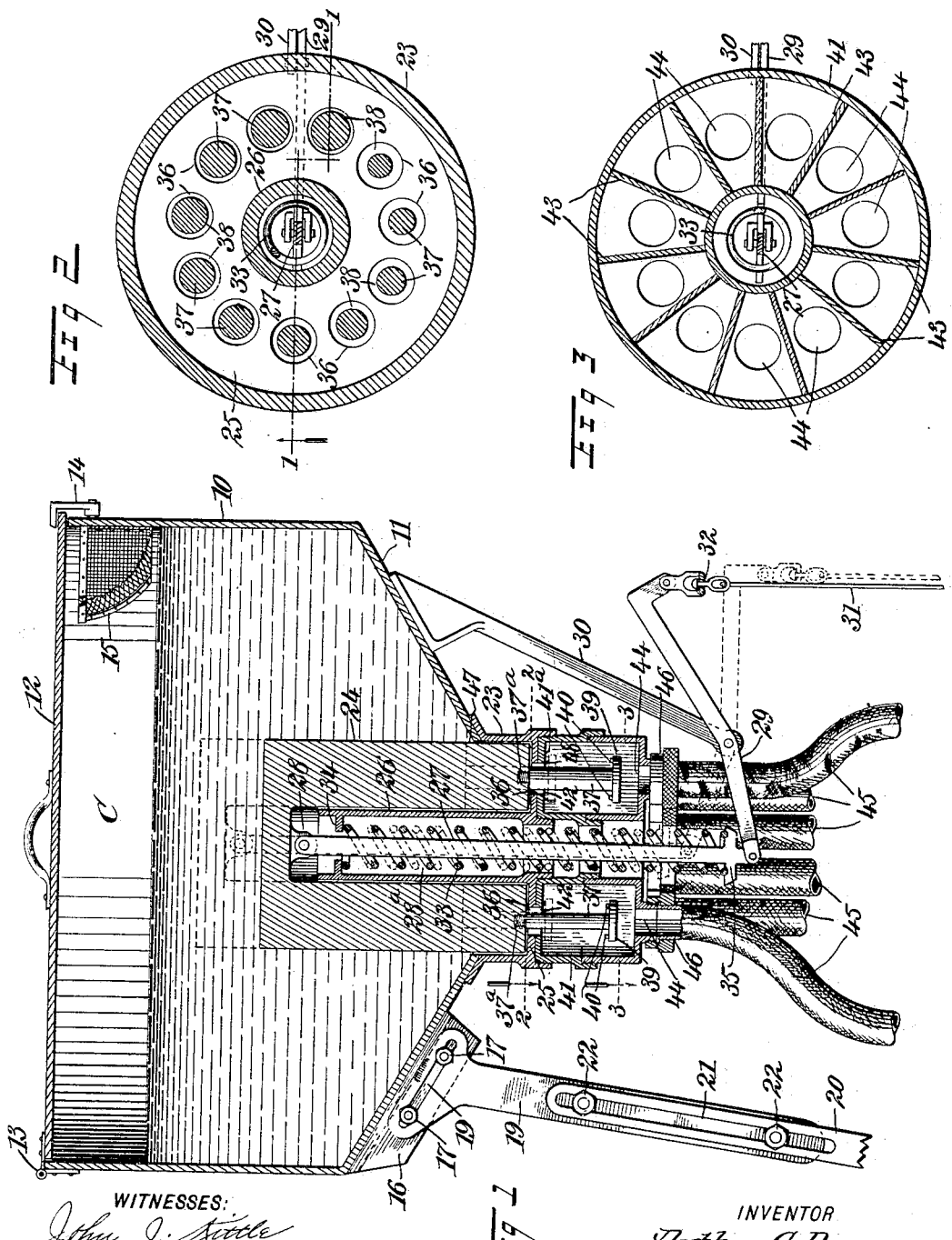
INVENTOR
Arthur G. Puerner
BY
ATTORNEYS
WITNESSES:

No. 769,632. Patented September 6, 1904.

UNITED STATES PATENT OFFICE.

ARTHUR GRANT PUERNER, OF STOUGHTON, WISCONSIN.

LUBRICATOR.

SPECIFICATION forming part of Letters Patent No. 769,632, dated September 6, 1904.

Application filed April 28, 1904. Serial No. 205,288. (No model.)

*To all whom it may concern:*

Be it known that I, ARTHUR GRANT PUERNER, a citizen of the United States, and a resident of Stoughton, in the county of Dane and State of Wisconsin, have invented a new and Improved Lubricator, of which the following is a full, clear, and exact description.

My invention relates to lubricators, and more particularly to those adapted for application to windmills and the like. In apparatus of this class on account of its comparative inaccessibility it is of importance to provide them with a lubricating device which will from a common reservoir positively deliver the lubricant to the various frictional surfaces of the windmill in cold as well as in warm weather, this supply being furnished in varying measured quantities to different elements. To achieve such results are the principal objects of my invention.

Reference is to be had to the accompanying drawings, forming a part of this specification, in which similar characters of reference indicate corresponding parts in all the figures.

Figure 1 is a vertical section through one embodiment of my invention, taken on the line 1 1 of Fig. 2; and Figs. 2 and 3 are full horizontal sections on the lines 2 2 and 3 3, respectively, of Fig. 1.

C designates a casing of the proper size to contain the desired quantity of oil or other lubricating material, it being here shown as consisting of a cylindrical side wall 10 and conical or converging bottom walls 11. The casing is provided with a cover 12, hinged at 13 and having a fastening device 14. At one side of the casing is supported a strainer 15, which may consist of a suitably-reinforced wire basket, through which the lubricant may be poured to separate out foreign particles. One side of the bottom of the casing has an elongated lug 16 extending from it, through which are bolts 17 17, projecting through a slot 18 in an end section 19 of an arm 20, which may be attached to the windmill or other machine which it is desired to lubricate. The end section is shown as longitudinally adjustable upon the arm by means of a slot 21 in one of the members, through which project bolts 22, carried by the other. These two slotted supports permit the movement of the casing in planes not far removed from right angles to one another, transversely of the bottom as well as longitudinally of it, and allow its positioning with relation to the parts to be lubricated.

In an extension 23 from the casing, which, as illustrated, is of cylindrical form and depends from an opening at the center of the bottom walls, is formed a receiving-chamber in which operates a piston or plunger 24, closely fitting the walls of the extension. Preferably located at the center of a bottom wall 25 across this casing is a guide-standard 26, which, as illustrated, is cylindrical and hollow. Through this standard passes a link or connecting-rod 27, which is articulated to lugs 28, depending from the head of a cylindrical recess 28ª, formed in the plunger and fitting closely about the standard. The opposite end of this connecting-rod is pivoted to a lever 29, fulcrumed on an arm 30, which is conveniently supported from the bottom of the reservoir. To the outer end of this lever is attached an operating member 31, which may consist of a wire, this being preferably connected through a swivel 32, which permits the movement of the windmill without imparting a twist to the wire. Encircling the connecting-rod is a spring 33, preferably of spiral form, having its upper end in engagement with an annular shoulder 34, located near the upper end of the standard and resting at its opposite end upon an enlargement 35 near the lower end of the connecting-rod. This spring exerts its tension to hold the plunger normally downward in contact with the bottom of the extension 23.

In the wall 25 is a series of openings 36, here shown as arranged in a circle and through which operate projections or rods 37, depending from the lower face of the plunger. These rods are preferably separable, they being here shown as provided with threaded ends 37ª, making into the plunger. The rods may be of different diameters, forming between them and the peripheries of the openings passages 38 of different areas. At the lower end of each rod is an enlargement or head 39, which furnishes a closure for the opening, but which in its position of coaction therewith is maintained at at least a slight distance from such opening by some such stop device as pins 40, projecting upward from the inner side of the head and which may contact with a wall below the openings.

Secured to the extension 23 at its under side is a continuation or delivery-casing 41, which is shown as formed in two parts for convenience in making and assembling. In the upper wall 41ª of this casing are openings 42, which register with those in the wall 25. The portions of the wall 41ª about these openings coact with the heads 39 to form valves, which, however, are prevented from complete closure by the presence of the stop devices. The casing 41 is provided with a separate chamber for each of the openings from the receiving-chamber, these being conveniently formed by radial partitions 43, and in the lower side of each chamber is a discharge-opening 44. To these discharge-openings may be connected pipes 45, preferably of flexible tubing and retained in place by unions or other securing devices 46.

In use the plunger is normally held against the lower wall of the casing extension and closes the openings therein, thus preventing the flow of the lubricant which is supplied to the reservoir. Now when it is desired to secure a flow of the lubricant through the pipes the wire is drawn down to raise the plunger through the lever and connecting-rod against the tension of the spring to the position shown in dotted lines in Fig. 1. This results in an opening 47 between the lower edge of the plunger and adjoining edge of the bottom wall of the casing through which the lubricant passes into the receiving-chamber, the air being expelled therefrom through valve-openings 48, these, however, being so narrow that but little liquid can flow through them. The receiving-chamber having been thus filled, the operating member is released, whereupon the spring forces the plunger back to its seat. This carries the projection-heads away from the wall 41ª and allows a passage of the lubricant into the separate delivery-chamber proportionately to the area of the passage between each projection and the periphery of its opening. At the same time the downward movement of the plunger urges the liquid through the delivery-chambers and into the tubes. If it is found desirable to vary the supply to any of the surfaces lubricated, this may be readily accomplished by removing the rod of the proper chamber and substituting another of different diameter. This capability of variation in the quantity measured is an important feature of my invention and one not possible in that type of lubricator in which the flow is through a series of unobstructed openings of different size: It will therefore be seen that my improved lubricator supplies the bearings of frictional surfaces in measured and variable quantities and that this action is positive, enabling it to effectually produce a flow through crooked as well as straight delivery-pipes and in winter, when the lubricant is liable to be viscous and difficult to handle, as well as in summer, when it is more fluid.

Having thus described my invention, I claim as new and desire to secure by Letters Patent—

1. A lubricator comprising a reservoir, a receiver provided with a plurality of openings, a delivery-receptacle connected with each opening, and means for closing the opening of each delivery-receptacle.

2. A lubricator comprising a reservoir, a receiver provided with a plurality of openings, a delivery-receptacle connected with each opening, and a plunger operating in the receiver and movable to close the openings into the delivery-receptacles.

3. A lubricator comprising a reservoir, a receiver provided with a plurality of openings, a delivery-receptacle connected with each opening, and a plunger fitting the receiver and extending into the reservoir.

4. A lubricator comprising a reservoir, a receiver provided with a plurality of openings, a delivery-receptacle connected with each opening, a plunger fitting the receiver, and a spring normally forcing the plunger toward the receiver.

5. A lubricator comprising a reservoir, a receiver provided with a plurality of openings, a delivery-receptacle connected with each opening, a plunger operating in the receiver, and projections from the plunger extending through the openings.

6. A lubricator comprising a reservoir, a receiver provided with a plurality of openings, a delivery-receptacle connected with each opening, a plunger operating in the receiver, and separable projections from the plunger extending through the openings.

7. A lubricator comprising a reservoir, a receiver provided with a plurality of openings, a delivery-receptacle connected with each opening, a plunger operating in the receiver, and closures for the openings mounted upon the plunger.

8. A lubricator comprising a reservoir, a receiver provided with a plurality of openings, a delivery-receptacle connected with each opening, a plunger operating in the receiver, projections from the plunger extending through the openings, and valve members carried by the plungers for coaction with the openings.

9. A lubricator comprising a reservoir, a receiver provided with a plurality of openings, a delivery-receptacle connected with each opening, a plunger operating in the receiver, and projections of different diameters extending from the plunger through the openings.

10. A lubricator comprising a reservoir, a receiver provided with a plurality of openings, a delivery-receptacle connected with each opening, a plunger operating in the receiver, projections from the plunger extending through the openings, valve members carried by the plunger for coaction with the openings, and means for maintaining the valve members somewhat removed from the openings.

11. A lubricator comprising a reservoir having a receiving-chamber provided with an opening, a plunger movable from the measuring-chamber into the reservoir to produce an opening from the reservoir to the chamber, and a projection from the plunger operating through the opening from the receiving-chamber and having an enlargement at its lower end.

12. A lubricator comprising a reservoir having a receiving-chamber provided with an opening, a plunger movable from the measuring-chamber into the reservoir to produce an opening from the reservoir to the chamber, and a separable projection from the plunger operating through the opening from the receiving-chamber.

13. A lubricator comprising a reservoir having a receiving-chamber provided with an opening, a hollow guide extending into the reservoir through the receiving-chamber, a plunger surrounding the guide, and a spring situated in the guide and exerting its force upon the plunger.

14. A lubricator comprising a reservoir having a receiving-chamber provided with an opening, a hollow guide extending into the reservoir through the receiving-chamber, a plunger surrounding the guide, a lever, and a link between the lever and plunger extending through the guide.

15. A lubricator comprising a reservoir having a receiving-chamber provided with an opening, a hollow guide extending into the reservoir through the receiving-chamber, a plunger surrounding the guide, a lever, a link between the lever and plunger extending through the guide, and a spring encircling the link and coacting with the plunger.

16. A lubricator comprising a reservoir having a receiving-chamber provided with an opening, a hollow guide extending into the reservoir through the receiving-chamber, a plunger surrounding the guide, a lever, a link between the lever and plunger extending through the guide, an operating member for the lever, and a swivel connecting said lever and operating member.

17. In a lubricator, the combination with a supporting-arm, of a reservoir, flexible tubing connected with the reservoir, and means for adjusting the position of said reservoir longitudinally and laterally of the arm.

In testimony whereof I have signed my name to this specification in the presence of two subscribing witnesses.

ARTHUR GRANT PUERNER.

Witnesses:
E. M. LADD,
E. H. BJOIN.